United States Patent [19]

Dawes

[11] 4,444,429

[45] Apr. 24, 1984

[54] RECREATIONAL UNIT FOR VEHICLE BEDS

[75] Inventor: Les A. Dawes, Tustin, Calif.

[73] Assignee: Industrial Financial Group, Tustin, Calif.

[21] Appl. No.: 361,611

[22] Filed: Mar. 25, 1982

[51] Int. Cl.³ .............................................. B60P 3/32
[52] U.S. Cl. .................................... 296/170; 296/51; 296/62; 135/88
[58] Field of Search ................ 296/27, 164, 170, 171, 296/169, 173, 51, 62; 135/88, 89

[56] References Cited

U.S. PATENT DOCUMENTS

| | | | |
|---|---|---|---|
| 2,502,024 | 3/1950 | Poche | 296/163 |
| 3,013,836 | 12/1961 | Groh | 296/170 |
| 3,175,857 | 3/1965 | Lewis | 296/164 |
| 3,381,994 | 5/1968 | Link | 296/170 |
| 3,420,567 | 1/1969 | Christensen | 296/27 |
| 3,516,708 | 6/1970 | Cox | 296/27 |
| 3,697,121 | 10/1972 | Park | 296/27 |
| 3,941,414 | 3/1976 | Platt | 296/170 |
| 4,113,301 | 9/1978 | Olmstead | 296/169 |

*Primary Examiner*—Robert R. Song

*Attorney, Agent, or Firm*—Banner, Birch, McKie and Beckett

[57] ABSTRACT

A recreational unit for a vehicle bed has two oppositely located cantilever outrigger units. Each cantilever outrigger unit includes a horizontal shelf slidably supported by the top of each vertical side wall of the vehicle bed and an upstanding shelf support attached to the shelf. A floor support member is located on the floor of the vehicle bed. The floor support member contains slots proximate each vertical side wall of the vehicle bed into which the bottom of the upstanding shelf support is received. The two outrigger units can be slid between a stored and an extended position. Thus, when each cantilever outrigger unit is deployed in the extended position, the combined action of the horizontal shelf resting on the vertical side wall of the vehicle bed and the abutment of the bottom of the upstanding shelf support against the edge of the slot forms a rigid cantilever type support for the cantilever outrigger unit. Furthermore, a tent is supported by a frame having side portions mounted to the two outrigger units. The front frame of the tent is attached to the vehicle tailgate in a substantially perpendicular position so that, when the tailgate is lowered, the front of the tent is automatically deployed.

20 Claims, 13 Drawing Figures

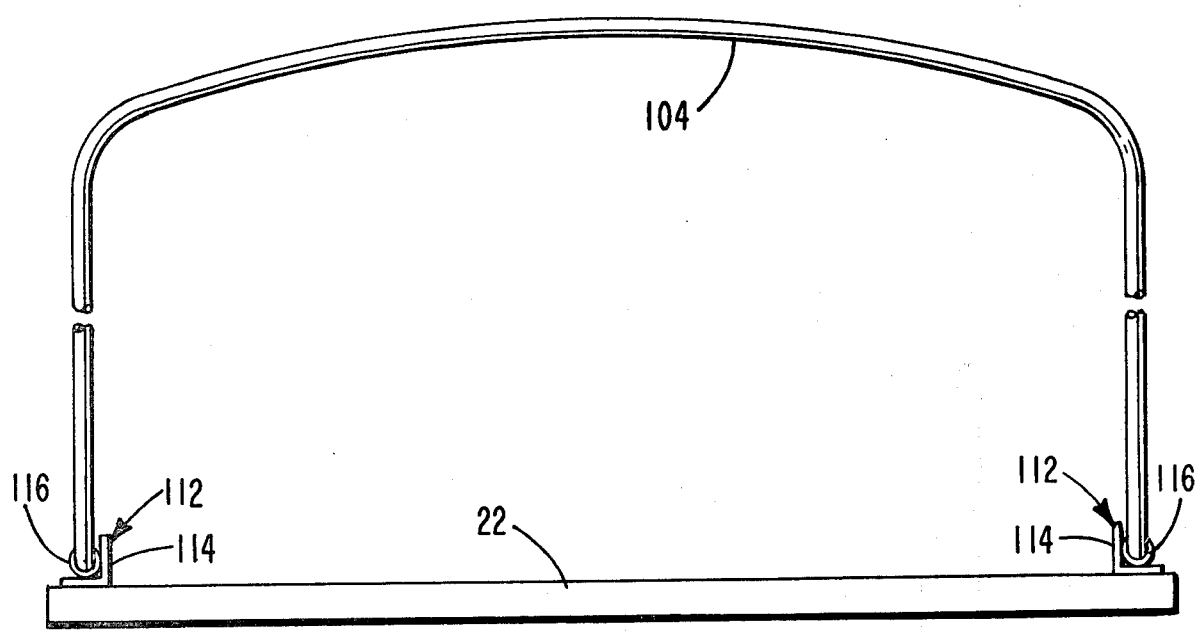
FIG. 5
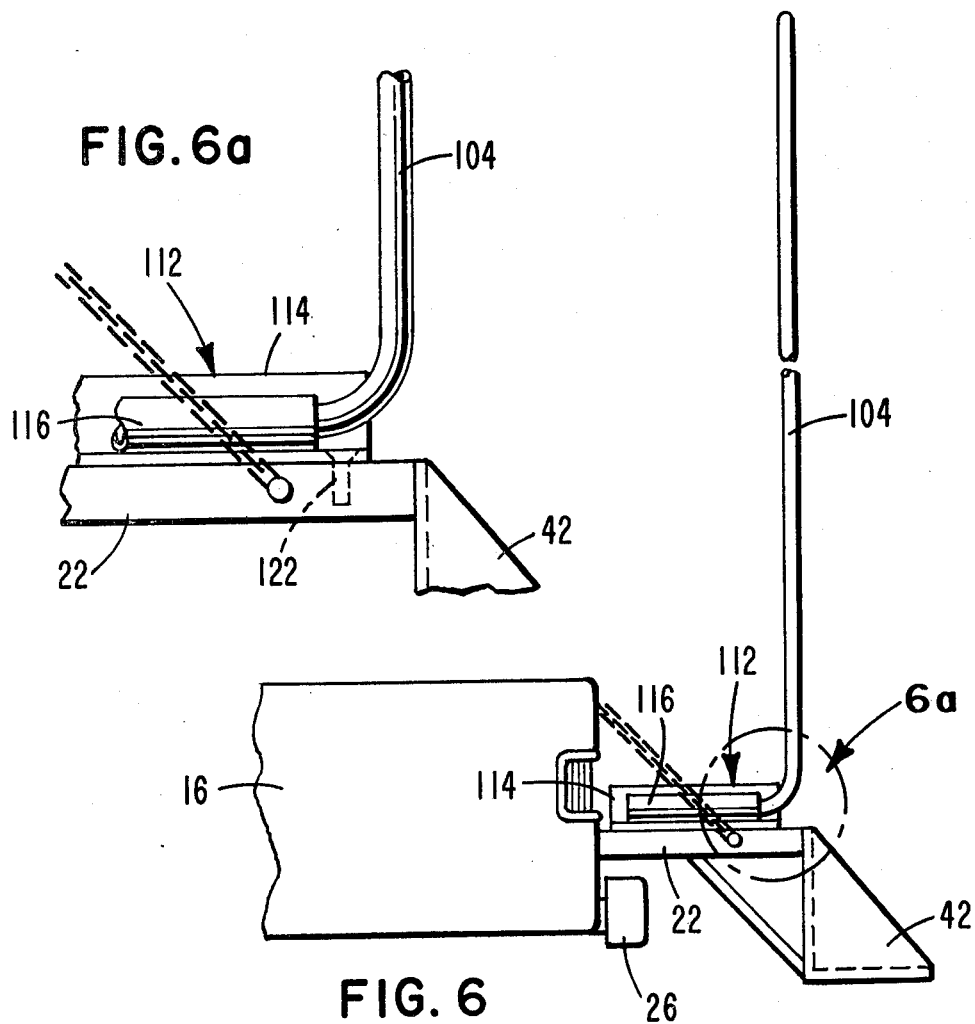
FIG. 6a
FIG. 6

RECREATIONAL UNIT FOR VEHICLE BEDS

BACKGROUND OF THE INVENTION

The present invention is directed to a recreational unit for a vehicle bed, and more particularly, to a recreational unit having extendable cantilever outrigger units and a tent frame having a portion mounted perpendicular to the tailgate so that the tent is deployed automatically when the tailgate is lowered.

Various types of vehicle recreational units have been deployed in the prior art. Typically, these units are adapted to fit into the bed of a truck or a trailer. Many of these recreational units include lateral platforms or width extensions to increase the size of the unit. Often times these extensions require special support devices to be attached to the vehicle or trailer. In addition, many units have tents or other deployable coverings. The tents require framework to hold them rigid and some mechanism by which the tent and framework can be erected.

Some examples of prior art relating to recreational units include U.S. Pat. Nos. 3,381,994; 3,941,414; 3,420,567; 4,113,301; and 3,175,857. The first four listed patents disclose camping trailers with lateral extensions. Typical of these is U.S. Pat. No. 3,381,994 which discloses a tent camper trailer. The trailer contains a longitudinal extension that slides out when deployed. Slidably mounted on the longitudinal extension are two lateral extensions. The trailer is covered by a tent mounted on a foldable, manually raised, frame. When extended, the two lateral extensions are suspended from the tent frame by means of attachment to the tent. When in the storage mode, the camper trailer reduces to a smaller volume.

U.S. Pat. No. 3,175,857 shows a typical truck camper tent, rather than a camping trailer to be pulled by a vehicle, that folds into the bed of a truck. To deploy the tent the rear and front tent frames are raised manually.

One of the problems encountered in using recreational vehicle units of the prior art, such as U.S. Pat. No. 3,175,857, is that the truck or trailer usually must be modified extensively to receive the unit. Such modifications include additional supports for lateral extensions of the unit, permanent mounting of tent frames, and installation of beds, stoves or other such equipment in the camping vehicle. Often times a whole trailer must be permanently modified, diminishing its usefulness. A further problem encountered with the prior art, such as U.S. Pat. No. 3,175,857, is that camping unit tents must be manually deployed, making them unappealing, inconvenient and time-consuming. Other problems involved with the prior art recreational units include expenses incurred by making extensive modifications to the vehicle to adapt it to camping needs. Weight is also a problem because the large amounts of required equipment tend to increase the weight, especially if a separate trailer is used, thereby increasing fuel consumption. A final problem encountered is the bulkiness of camping equipment. Tents, frames, and other equipment take up large amounts of space, causing vision problems for the driver of the vehicle. Large, bulky trucks or trailers filled with camping equipment are also hard to control at higher speeds and in windy conditions.

SUMMARY OF THE INVENTION

Therefore, it is an object of the present invention to provide a recreational unit adapted to fit into the bed of a vehicle that requires little or no modification of the vehicle bed for use.

It is another object of the invention to provide a recreational unit that has lateral extensions which increase the width of the unit but require no support to be attached to the vehicle bed walls.

It is a further object of the present invention to provide a recreational unit with a tent that can be deployed automatically by the lowering of the tailgate.

It is still a further object of the present invention to provide a recreational unit that reduces to a small volume when in storage, yet still provides storage for substantial amounts of camping equipment.

It is another object of the present invention to provide a recreational unit that can be removably placed in a vehicle bed with little or no modification of the bed.

It is a further object of the present invention to provide a recreational unit with a tent that is easily deployed.

It is another object of the present invention to provide a cantilever outrigger utility unit for a vehicle bed without modifying the bed.

These and other objects are obtained by a recreational unit for a vehicle bed that has a floor, at least two walls, and a tailgate. The recreational unit is comprised of at least two deployable cantilever outrigger units. Each unit is comprised of a horizontal shelf, a portion of the shelf slidably resting on a vehicle wall. An upstanding support member is attached to the shelf to support the shelf. The recreational unit is also comprised of a floor support member for supporting the outrigger unit. The floor support member slidably supports the upstanding support member. The floor support further includes a slot into which the bottom of the upstanding support member fits to rigidly support the outrigger unit.

A tent is supported by a frame which includes side portions attached to the cantilever outrigger units and a front portion, which forms the front of the tent, mounted perpendicular to the tailgate. As a result, the front portion of the frame is automatically placed in an upstanding position when the tailgate is lowered to its horizontal position. The tent is permanently attached to the frame, thus automatically deployed when the tailgate is lowered.

BRIEF DESCRIPTION OF THE DRAWINGS

FIG. 5 is an end view of the front tent deployment frame.

FIG. 6 is a side view of the rear of the vehicle bed and the front tent frame in the deployed position.

FIG. 6a is a detailed view of the end portion of the tailgate and the front tent frame mounting mechanism.

DETAILED DESCRIPTION OF A PREFERRED EMBODIMENT

Figure 1:
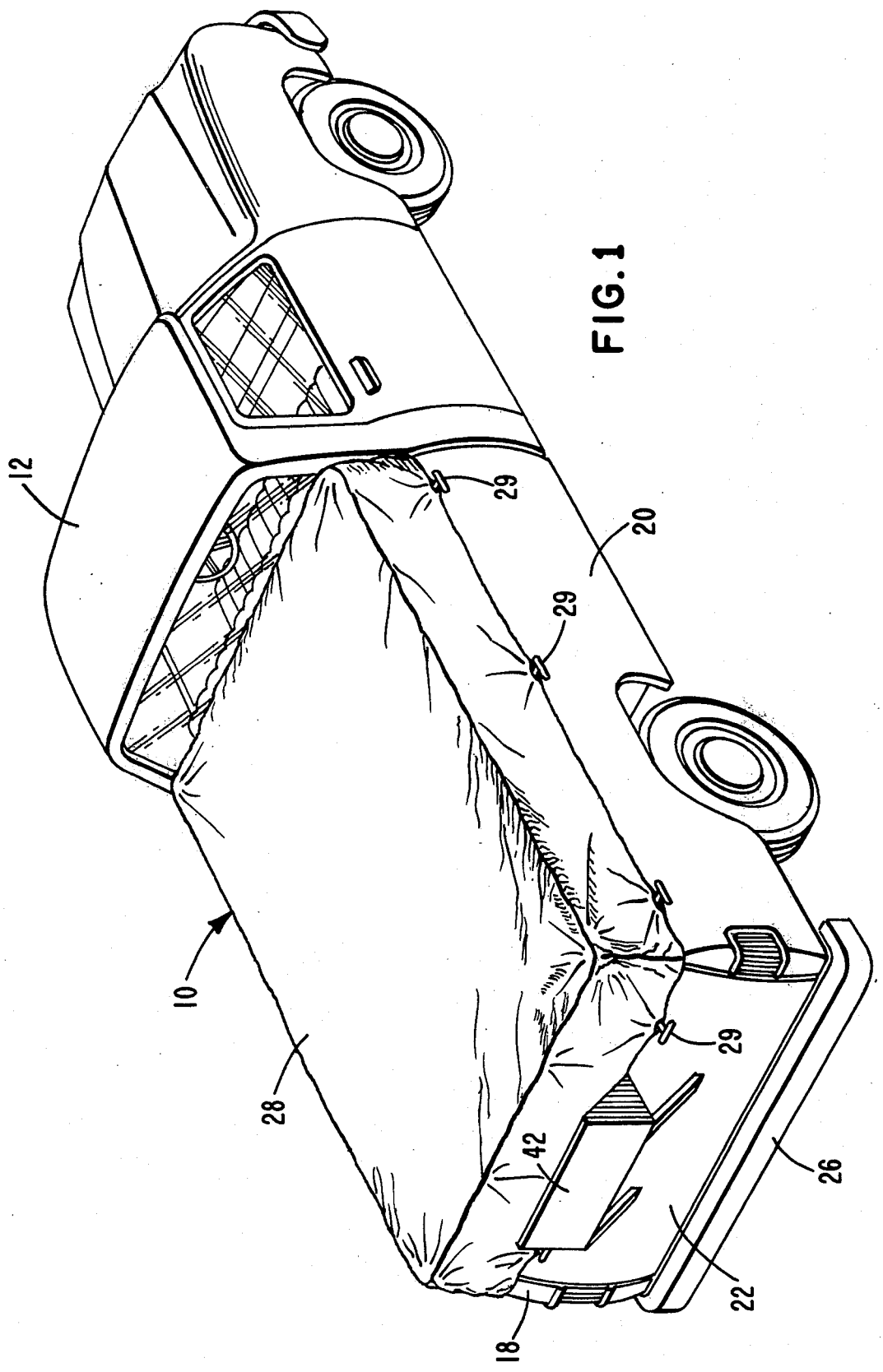
FIG. 1 is a perspective view of the recreational unit in the stored travel position.

There is shown generally in the figures a vehicle adapted for recreational use. The recreational vehicle comprises a conventional vehicle 12 that has a deployable recreational unit 14 fitted within its bed 16. The recreational unit 14 contains a pair of opposing outrigger units 200, 202 that slidably extend within the vehicle bed 16 from a stored position to an extended position. The unit 14 also has modular recreational components located within bed 16. The entire recreational unit 14 is covered by a tent 100 that is supported and held rigid by tent frame 102.

Figure 2:
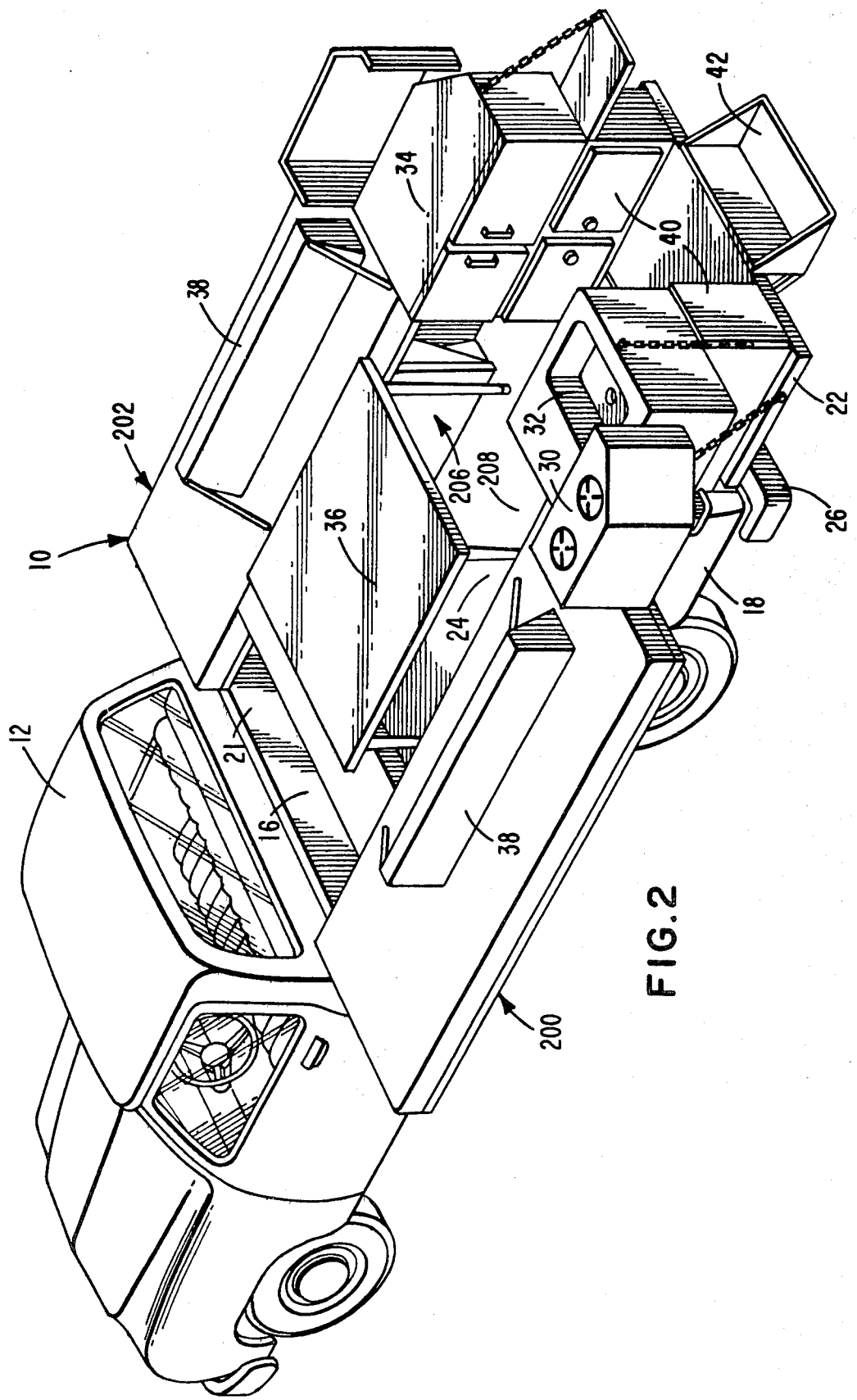
FIG. 2 is a perspective view of the recreational unit in the deployed position without the attached tent or tent frame.

Referrings to FIGS. 1 and 2, vehicle 12 has bed 16. Vehicle 12 can be any type of vehicle with a bed, including a pick-up truck or an automobile. The vehicle bed 16, which can be of any size or shape, comprises a left bed wall 18, a right bed wall 20, a front wall 21, a tailgate 22, and a bed floor 24. A standard bumper 26 is attached to the vehicle 12 at the rear exterior of bed 16 below tailgate 22.

The recreational unit 14 is situated inside vehicle bed 16. When in the stored, travel mode, as shown in FIG. 1, the unit 14 is very compact and contained substantially within bed 16. A tarp 28 of conventional construction covers the unit. The tarp 28 is fastened to the vehicle 12 by any standard means to protectively cover the unit 14. As can be seen, a driver of vehicle 12 has no substantial impairment of the rearward vision when the unit is stored, permitting vehicle 12 to be driven more safely.

FIG. 2 shows the recreational unit 14 in the deployed mode. Left cantilever outrigger unit 200 is supportedly resting on left bed wall 18, and right cantilever outrigger unit 202 is similarly resting on right bed wall 20. Located on the bed floor 24 is outrigger floor support 208. The details of the cantilever outrigger units will be discussed later.

Conventional modular recreational components such as stove 30, sink 32, cooler 34, table 36, back cushions 38, and cabinets 40 are situated within bed 16. In the deployed mode, the various components are taken out of their storage positions, unfolded, and properly positioned within bed 16. Lowered tailgate 22 also supports some of the components, thereby increasing the useful length of the bed 16. The modular components can include any other device desired, such as a shower stall. As can be seen in FIG. 1, all of the modular components, when folded and placed in their stored positions, are designed to minimize the overall bulk of the recreational unit.

Mounted on tailgate 22 is tailgate step 42. Step 42 extends downwardly from tailgate 22 when the tailgate is lowered to assist users of recreational unit 14 to enter bed 16. When tailgate 22 is raised, step 42 extends rearwardly and is not covered by tarp 28.

Figure 3:
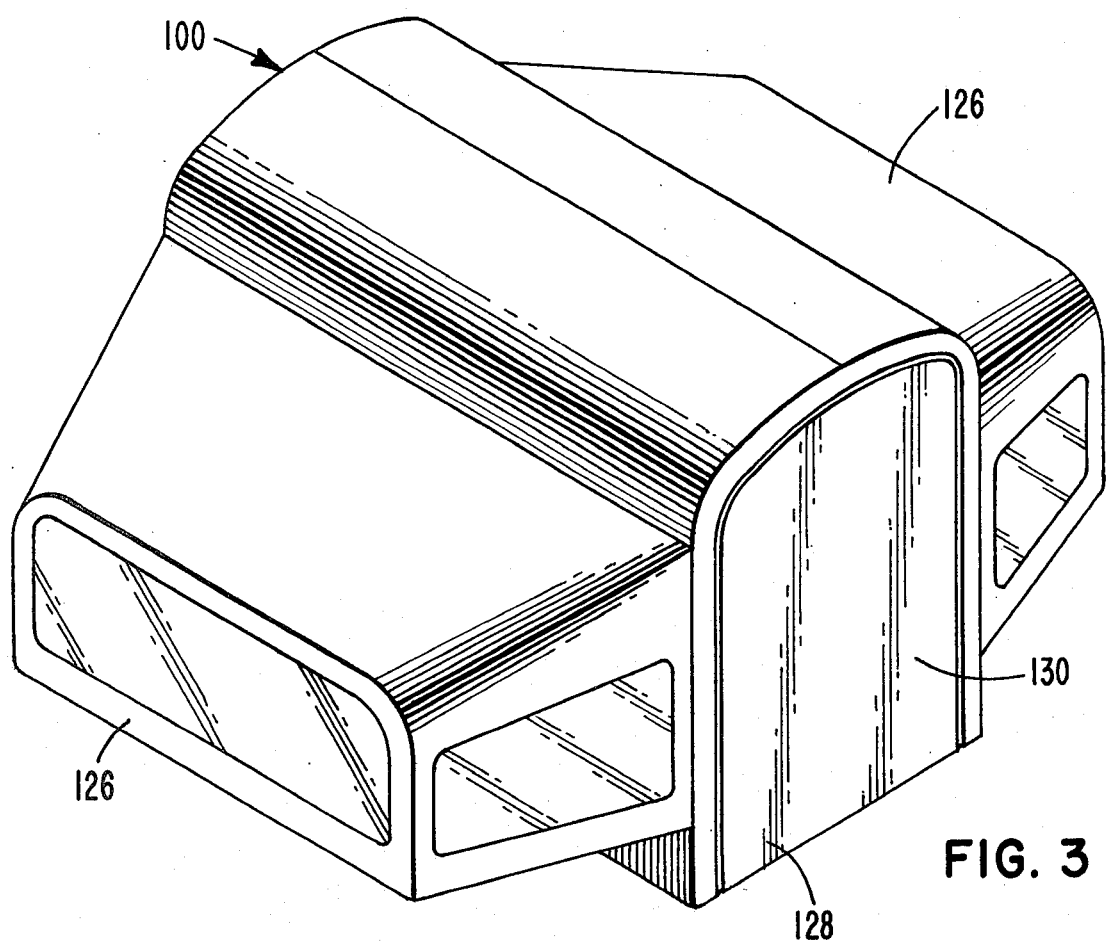
FIG. 3 is a perspective view of the recreational unit tent in the deployed position.

FIGS. 3 through 7 show in more detail the tent 100 and tent frame 102 that cover recreational unit 14. As seen in FIG. 3, tent 100 extends the length of bed 16 and lowered tailgate 22. In addition to covering bed 16, the tent also covers both extended outrigger units 200 and 202. The tent is of conventional construction and can include windows on the outrigger portions 126 and an entrance flap 130 at the front portion of tent 100.

Tent 100 is mounted on tent frame 102. Frame 102, shown in FIG. 4, comprises four U-shaped frames: a front deployment frame 104, a left tent frame 106, a right tent frame 108 and a rear tent frame 110. Each tent frame is of a tubular construction and made of a preferably light-weight material, such as aluminum.

Front deployment frame 104 is attached to tailgate 22, as seen in FIG. 6, by means of two mounting brackets 112. Each mounting bracket 112 comprises an angle frame 114 and a tubular mount 116 attached to frame 114. Angle frame 114 is longer than tubular mount 116 and contains a rear, countersunk hole 118 and a front, internally threaded hole 120. As seen in FIG. 6a, a screw 122 fits into countersunk hole 118 to secure the rear of bracket 112 to tailgate 22. The two ends of front deployment frame 104 are fitted within and secured to tubular mounts 116.

Left tent frame 106 is pivotally fastened to left outrigger 200 and right tent frame is likewise fastened to right outrigger 202. Attached near the outside corners of outriggers 200 and 202 are pivoting brackets 230 which receive lower portion 232 of each leg of side tent frames 106 and 108. (See FIG. 9). Each of the two side tent frames 106 and 108 are conventionally snap locked when erect. When stored, each folds down into bed 16.

Rear tent frame 110 is comprised of two halves, left half 110L and right half 110R. Left half 110L is pivotally fastened to left outrigger 200 while right half 110R is similarly fastened to right outrigger 202. When stored, both halves 110L and 110R are rotated 90 degrees to lie flat atop the outrigger unit to which they are attached. To erect frame 110, both halves 110L and 110R are raised and conventionally snap locked. Halves 110L and 110R are then connected by frame connection 134, thereby forming rear tent frame 110.

To erect tent 100, tailgate 22 is lowered, automatically raising front deployment frame 104. Next, the two side frames 106 and 108 are erected and locked into place. The two halves of tent frame 110 are erected, locked into place, and joined at frame connection 134.

Figure 8:
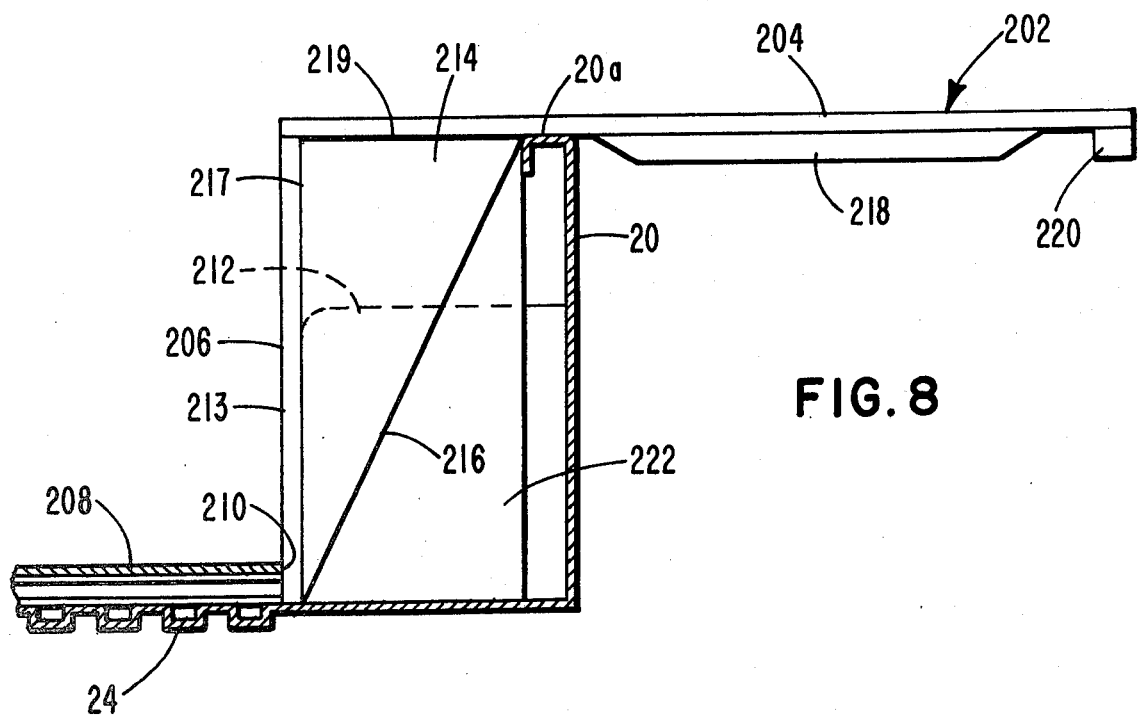
FIG. 8 is a side view of the right outrigger unit in the extended position.
Figure 4:
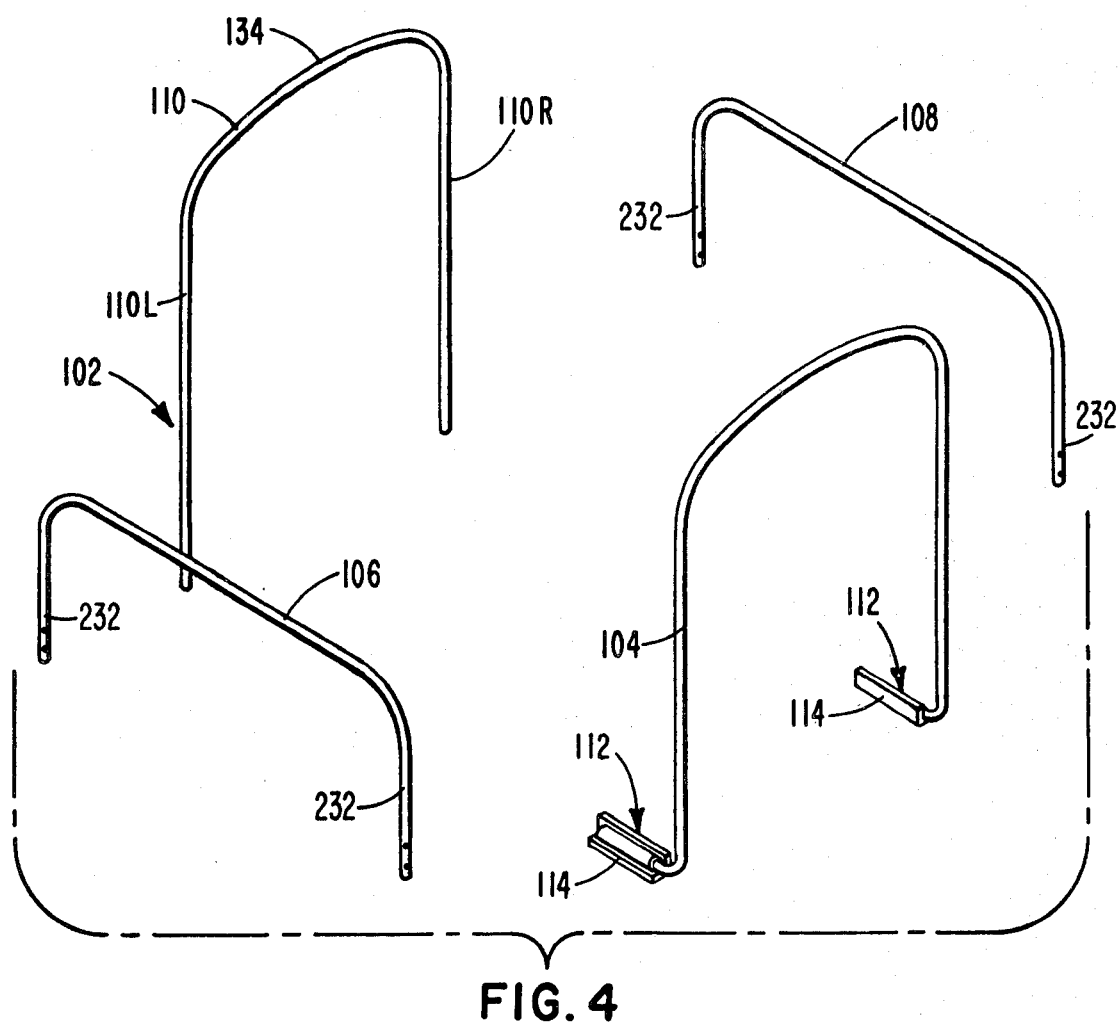
FIG. 4 is a perspective view of the recreational unit tent frame in the deployed position.
Figure 7:
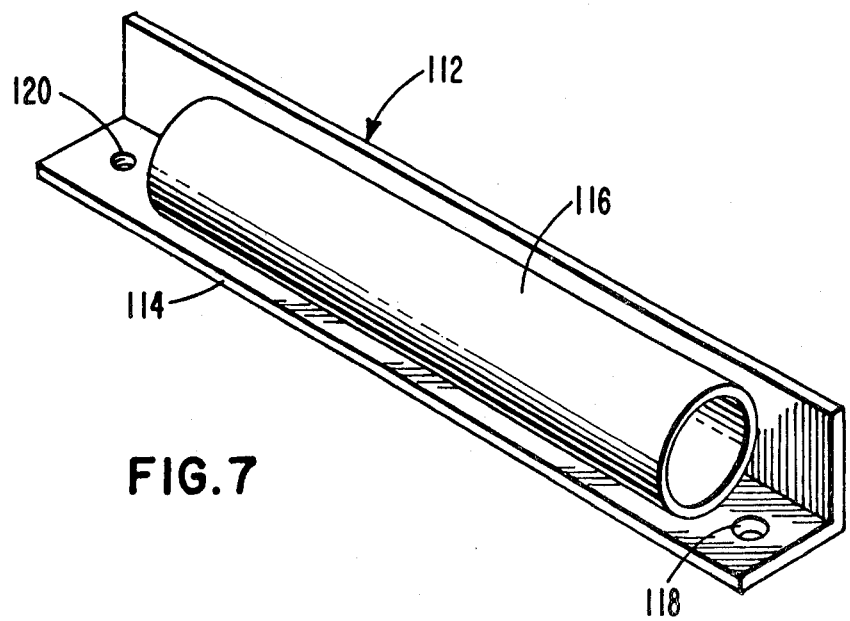
FIG. 7 is a perspective of one of the front tent frame mounts for the tailgate.
Figure 9:
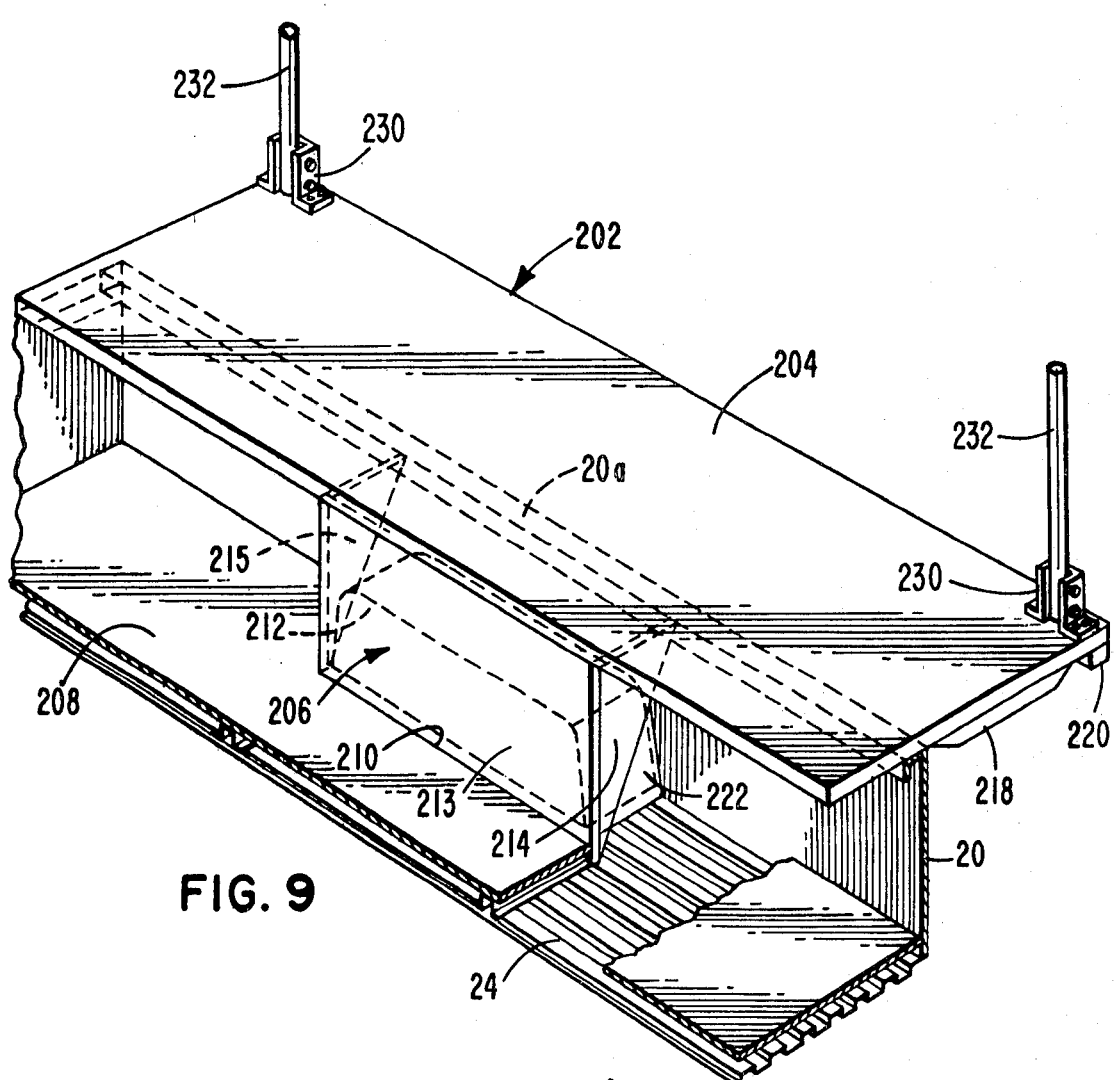
FIG. 9 is a perspective of the right outrigger unit in the extended position with the floor support member partially cut away to reveal the vehicle bed.
Figure 10:
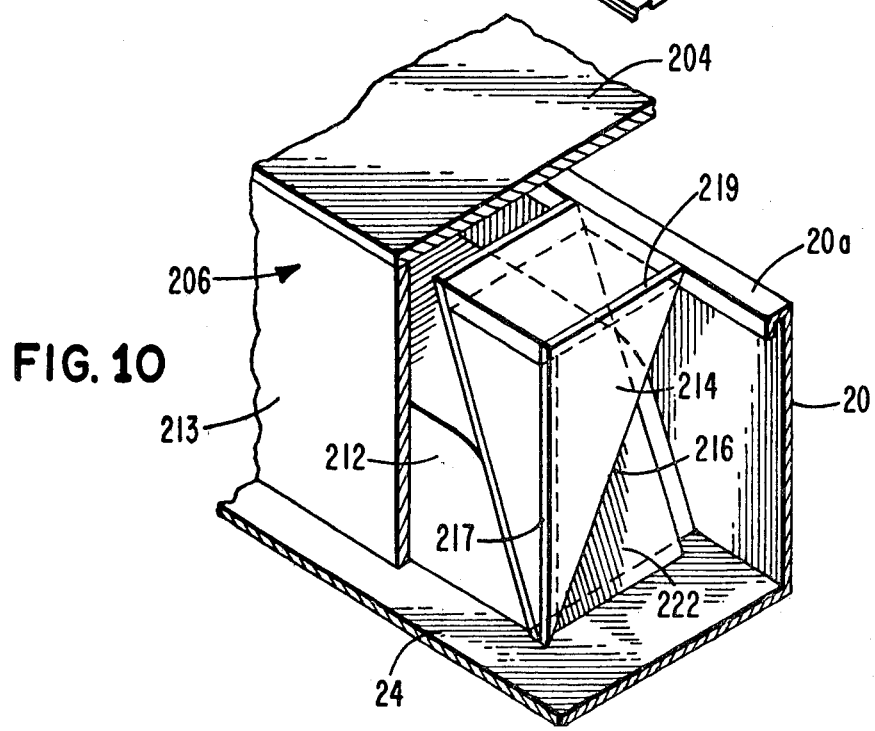
FIG. 10 is a perspective view of the right outrigger vertical support covering the right wheel well.

FIGS. 8 through 12 show in more detail the construction of the outrigger units. Although FIGS. 8 through 10 show only the right outrigger unit 202, the left outrigger unit 200 isa mirror image of outrigger 202. FIGS. 8 and 9 show that outrigger unit 202 comprises a horizontal shelf 204 that rests on the right bed wall 20 when the outrigger 202 is extended. Horizontal shelf 204 is usually parallelogramshaped and typically is rectangular. The bed wall 20 acts as a fulcrum point 20a when weight is placed on shelf 204. Upstanding shelf support member 206 is attached to the interior end of shelf 204 and together with right bed wall 20 vertically supports shelf 204.

Upstanding shelf support member 206 comprises three vertical walls: an interior wall 213, a rear wall 214, and a front wall 215. Interior wall 213 is also usually rectangular and is slightly longer, longitudinally, than wheel well 212. Rear and front wall 214 and 215 are shaped like right triangles with the hypotenuse side 216 facing the right bed wall 20. The base legs 217 of each walls 214 and 215 are attached to interior wall 213. The legs 219 of the rear and front walls 214, 215 and the upper surface of interior wall 213 are attached to the underside of horizontal shelf 202.

Floor support member 208 covers the entire bed floor 24 and contains a slot 210 next to each wheel well 212. The bottom of the upstanding shelf support interior wall 213 fits into slot 210 when outrigger 202 is extended. The combined action of horizontal shelf 204 resting on right bed wall 20 in conjunction with the abutment of the bottom of upstanding shelf support interior wall 213 against the edge of slot 210 forms a rigid cantilever type support for the cantilever outrigger unit 202. Upstanding shelf support 206, as seen in FIG. 10, houses wheel well 212 and gives outrigger unit 202 longitudinal stability by preventing longitudinal movement of outrigger unit 202. If force is placed on the external portion of outrigger 202, upstanding shelf support 206 is abuttedly supported by floor support member 208 and prevents shelf 202 from pivoting about the fulcrum point 20a on bed wall 20.

Figure 11:
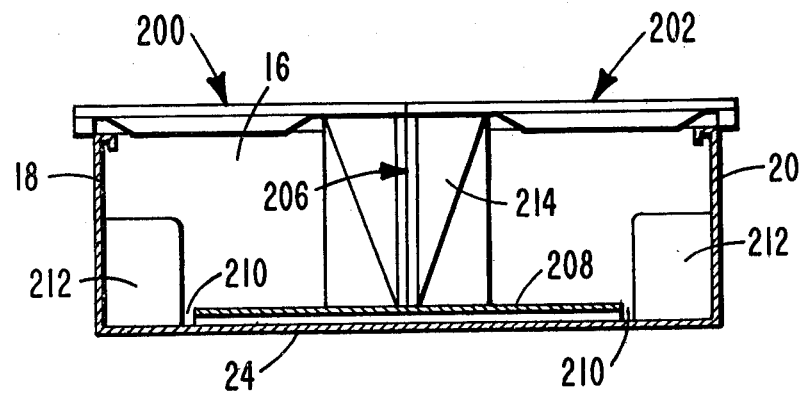
FIG. 11 is an end view of the two outrigger units in the stored travel position.
Figure 12:
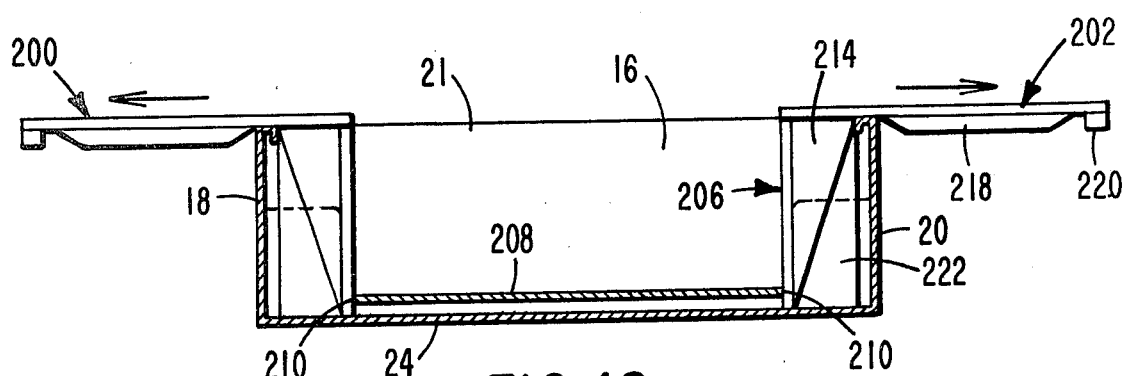
FIG. 12 is an end view of the two outrigger units in the extended position.

Outriggers 200 and 202 are stored abutting one another as seen in FIG. 11. When the two outrigger units are slid from the deployed position seen in FIG. 12 to the stored position seen in FIG. 11, each is pushed back towards the longitudinal center of bed 16. As each outrigger unit 200, 202 is pushed towards the center, filler ramps 218 act to lift the outrigger unit vertically into the storage mode. Support block 220 acts to secure stored outrigger units 200 and 202 by preventing the units from moving laterally.

To deploy recreational unit 14, tarp 28 is first removed and tailgate 22 is lowered. As tailgate 22 is lowered, front deployment frame 104 raises up, automatically erecting the front portion of tent 100. Next, outriggers 200 and 202 are pulled away from the longitudinal center of bed 16 and extended until the vertical supports 206 fall into slot 210. The bed walls 18, 20 acting in conjunction with the bottom of the two upstanding shelf supports 106 abuttedly supported by the edges of slots 210 form rigid cantilever type supports for the two cantilever outrigger units 200 and 202. Side frames 106, 108 are then manually erected as well as the two halves of rear frame 110, which are subsequently joined together at joint 134. The modular components are removed from their stored positions and placed in the proper configuration. Recreational unit 14 is then ready for use. To store recreational unit 14 the above process is merely repeated in reverse.

Of course, it should be understood that changes can be made to the disclosed preferred embodiment. For instance, tent 100 may have only a rear deployment frame and a front deployment frame; the two outrigger shelves having no side frames. In addition, many different modular components can be substituted for the ones listed. Thus it will be obvious to one of ordinary skill in the art that numerous modifications may be made without departing from the true spirit and scope of the invention, which is to be limited only by the appended claims.

I claim:

1. A recreational unit for a vehicle bed having a floor, two vertical side walls and a tailgate movable between upstanding and horizontal positions, said recreational unit comprising:

two cantilever outrigger units supportable on opposite sides of said vehicle bed and movable between a storage position and an extended position, each of said cantilever outrigger units comprising a horizontal shelf capable of resting on a vertical side wall of said vehicle bed and an upstanding shelf support positionable within said vehicle bed and connected to said horizontal shelf;

said horizontal shelf being slidable on said vertical side wall of said vehicle bed between the storage and extended positions;

a floor support member placeable on said floor of said vehicle bed to support said cantilever outrigger units, said floor support member including a slot proximate said vertical side wall of said vehicle bed to receive the bottom end of said upstanding shelf support of said cantilever outrigger unit, said slot and said vertical side wall forming a rigid cantilever support for said outrigger unit when said outrigger unit is in the extended position;

a tent having sides attached to said cantilever outrigger units;

and frame means fastened to said tailgate for automatic deployment of said tent when said tailgate is lowered from the upstanding position to the horizontal position, said frame means extending from said tailgate at a substantially right angle to said tailgate and moving from a substantially horizontal stored position to an erect position when said tailgate is lowered to automatically deploy said tent.

2. A recreational unit in accordance with claim 1 wherein said horizontal shelf when deployed rests atop said vertical side wall, said vertical side wall being at a position between the interior and exterior lateral edges of said horizontal shelf so that said vertical side wall acts as a fulcrum point when a force is placed on said horizontal shelf exterior to said vertical side wall.

3. A recreational unit in accordance with claim 2 wherein said slot abuttingly supports said cantilever outrigger unit when deployed to prevent pivoting about said fulcrum point on said vertical side wall.

4. A recreational unit in accordance with claim 2 wherein said horizontal shelf has at least one filler ramp attached to the underside of said horizontal shelf, said filler ramp having both interior and exterior inclined sides to elevate said cantilever outrigger unit.

5. A recreational unit in accordance with claim 2 wherein said horizontal shelf portion proximate the exterior lateral edge rests upon said vertical side wall when said horizontal shelf is in the stored position.

6. A recreational unit in accordance with claim 1 wherein said upstanding shelf support comprises three upstanding walls, an interior wall substantially parallel to said vertical side wall and two side walls substantially perpendicular to said interior wall, said two side walls attached to said interior wall and extending outwardly towards said vertical side wall, said vehicle bed having a wheel well extending inwardly, said upstanding shelf support housing said wheel well when said cantilever outrigger unit is extended and the bottom of said interior wall of said upstanding shelf support fitting into said slot.

7. A recreational unit in accordance with claim 1 wherein said floor support member is a platform substantially covering said floor of said vehicle bed.

8. A recreational unit in accordance with claim 7 wherein said upstanding shelf support is slidable along said platform when said cantilever outrigger unit moves between stored and extended positions.

9. A recreational unit in accordance with claim 1 wherein said frame means comprises a front tent frame attached perpendicular to said tailgate and an oppositely located rear tent frame that folds downwardly into said vehicle bed when in the stored position.

10. A recreational unit in accordance with claim 9 wherein said frame means also comprises a left side tent frame attached to said left outrigger unit and a right side tent frame attached to said right outrigger unit, both of said side tent frames folding downwardly into said vehicle bed when in the stored position.

11. A recreational unit for a vehicle bed having a tailgate movable between upstanding and horizontal positions, said recreational unit comprising:
a tent supportable by said vehicle bed; and
frame means fastened to said tailgate for automatic deployment of said tent when said tailgate is lowered from the upstanding position to the horizontal position, said frame means extending from said tailgate at a substantially right angle to said tailgate and moving from a substantially horizontal stored position to an erect position when said tailgate is lowered to automatically deploy said tent.

12. A recreational unit in accordance with claim 11 wherein said frame means comprises a front tent frame attached perpendicular to said tailgate and an oppositely located rear tent frame that folds downwardly into said vehicle bed when in the stored position.

13. A cantilever utility unit for a vehicle bed having a floor and at least one vertical side wall, said cantilever utility unit comprising:
at least one cantilever outrigger unit supportable by said vehicle bed and movable between a storage position and an extended position, said cantilever outrigger unit comprising a horizontal shelf capable of resting on a vertical side wall of said vehicle bed and an upstanding shelf support positionable within said vehicle bed and connected to one end of said horizontal shelf, said horizontal shelf being slidable on said vertical side wall of said vehicle bed between the storage and extended positions; and
a floor support member placeable on said floor of said vehicle bed to support said cantilever outrigger unit, said floor support member including a slot proximate said vertical side wall of said vehicle bed to receive the bottom end of said upstanding shelf support of said outrigger unit, said slot and said vertical side wall forming a rigid cantilever support for said cantilever outrigger unit when said cantilever outrigger unit is in the extended position.

14. A cantilever utility unit in accordance with claim 13 wherein said horizontal shelf when deployed rests atop said vertical side wall, said vertical side wall being at a position between the interior and exterior lateral edges of said horizontal shelf so that vertical side wall acts as a fulcrum point when a force is placed on said horizontal shelf exterior to said vertical side wall.

15. A cantilever utility unit in accordance with claim 14 wherein said slot abuttingly supports said cantilever outrigger unit when deployed to prevent pivoting about said fulcrum point on said vertical side wall.

16. A cantilever utility unit in accordance with claim 14 wherein said horizontal shelf has at least one filler ramp attached to the underside of said horizontal shelf, said filler ramp having both interior and exterior inclined sides to elevate said cantilever outrigger unit.

17. A cantilever utility unit in accordance with claim 14 wherein said horizontal shelf portion proximate the exterior lateral edge rests upon said vertical side wall when said horizontal shelf is in the stored position.

18. A cantilever utility in accordance with claim 13 wherein said upstanding shelf support comprises three upstanding walls, an interior wall substantially parallel to said vertical side wall and two side walls substantially perpendicular to said interior wall, said two side walls attached to said interior wall and extending outwardly towards said vertical side wall, said vehicle bed having a wheel well extending inwardly, said upstanding shelf support housing said wheel wall when said cantilever outrigger unit is extended and the bottom of said interior wall of said upstanding shelf support fitting into said slot.

19. A cantilever utility unit in accordance with claim 18 wherein said interior walls of said cantilever outrigger units abut when said cantilever outrigger units are in the stored position.

20. A cantilever utility unit in accordance with claim 13 wherein said floor support member is a platform substantially covering said floor of said vehicle bed, said upstanding shelf support being slidable along said platform when said cantilever outrigger unit moves between stored and extended positions.

* * * * *